United States Patent [19]
Johansen

[11] Patent Number: 5,042,773
[45] Date of Patent: Aug. 27, 1991

[54] MERCHANDISE DISPLAY DEVICE

[75] Inventor: Norman A. Johansen, North Ridgeville, Ohio

[73] Assignee: The Sherwin-Williams Company, Cleveland, Ohio

[21] Appl. No.: 460,296

[22] Filed: Jan. 3, 1990

[51] Int. Cl.[5] ..... F16M 13/00
[52] U.S. Cl. ..... 248/541; 248/229; 248/230
[58] Field of Search ..... 248/539, 540, 541, 229, 248/230, 231.5, 231.6, 314, 316.1, 316.5, 316.6; 24/487, 339, 542, 517, 268, 19

[56] References Cited

U.S. PATENT DOCUMENTS

| | | | |
|---|---|---|---|
| 138,799 | 5/1873 | Gleason | 248/231.5 |
| 151,517 | 3/1875 | Keam | 24/339 |
| 1,104,352 | 7/1914 | Erlandsson | 248/229 |
| 1,465,185 | 8/1923 | Sandberg | 248/229 |
| 1,535,396 | 4/1925 | Buehler | 248/541 |
| 1,686,678 | 10/1928 | Burke | 24/339 |
| 1,862,175 | 6/1932 | Carlson | 24/542 |
| 2,098,828 | 11/1937 | Ludwick | 211/162 X |
| 2,441,734 | 5/1948 | Van Hyning | 248/230 |
| 2,633,810 | 4/1953 | Freeman | 211/162 X |
| 3,494,072 | 2/1970 | Olson | 24/487 |
| 3,910,541 | 10/1975 | German | 248/314 |
| 4,003,470 | 1/1977 | Lagorio et al. | 211/50 |
| 4,062,452 | 12/1977 | Bartholomew | 211/55 |
| 4,077,520 | 3/1978 | Stevenson | 211/55 |

FOREIGN PATENT DOCUMENTS

| | | | |
|---|---|---|---|
| 141028 | 2/1949 | Australia | 24/542 |

*Primary Examiner*—Ramon O. Ramirez
*Assistant Examiner*—Robert A. Olson
*Attorney, Agent, or Firm*—Robert E. McDonald; Steven W. Tan

[57] ABSTRACT

A merchandise display device for supporting merchanise, advertising materials or the like, having a one-piece deformable body with a support portion for engagement with a support member, such as a paint can, and a display portion for supporting the merchandise, advertising materials or other display items. A fastener clip is also provided for securing the body member in a folded display position, and for maintaining the support member and display items in clamping engagement with the body member. The support and display portions are formed by juxtaposed first and second halves of the body member, when the body member is folded together and the clip or clips are engaged with free halves of the body member in display position. The first and second halves of the body member are substantially mirror images of one another. A central axis divides the first and second halves and intersects a mid-point at the fold in the body member in the display position. The first and second halves of the body member include mirror image profile portions having predetermined configurations which extend outwardly from the central axis for surrounding the desired support member. Additional mating profile portions having predetermined configurations are also provided on the first and second halves for engagement with the desired merchandise, advertising materials or other display items.

14 Claims, 5 Drawing Sheets

MERCHANDISE DISPLAY DEVICE

TECHNICAL FIELD

The present invention relates to a merchandise display device for displaying merchandise, advertising materials or the like, and more particularly to a one-piece deformable member which is supported on the merchandise itself, and which also displays other merchandise or advertising materials.

BACKGROUND OF THE INVENTION

Retail paint stores typically offer paint products and accessories, as well as a variety of other home improvement supplies, for sale. Paint cans displayed in such retail stores are typically stacked on one another in display shelves, in pyramid-type configurations on the floor, or simply in open boxes stacked on the floor.

The advertising or informative materials which promote the products, or provide price and quantity information, are preferably located adjacent the products for the convenience of the customers.

In the past, advertising materials have been located on signs posted near or on the products. Additionally, product information has been posted on the shelf under or immediately adjacent the product displayed. The advertisements and product information displayed in this fashion are often not securely or attractively displayed, or readily visible to the customers. Mechanisms for displaying such materials or information can be expensive, unable to be reused or difficult to assemble.

SUMMARY OF THE INVENTION

The present invention provides a new and improved merchandise display device constructed and arranged to display merchandise, advertising materials or other display items. The device uses a one-piece deformable member which is secured to the merchandise displayed, such as a paint can, and which also supports advertising materials or other merchandise.

In accordance with the preferred embodiment of the invention, the merchandise display device includes a one-piece plastic body member which, in a display position, defines a support portion for engagement with the merchandise, and a display portion for engagement with the display items. Fastener clips are also included for securing and maintaining the body member in display position. The body member includes first and second halves, each of which includes first and second profile portions having a pre-determined configuration.

In the preferred embodiment, the first and second profile portions each have semi-circular cross-sectional predetermined configurations. The profile portions are positioned such that bending of the body member at a mid-point between the halves, and juxtaposition of the first and second halves, positions the respective profile portions in mirror image relationship. In this position, the predetermined configurations of the first profile portions form a cylindrical support portion, and the second profile portions form a cylindrical display portion. The aligned first and second profile portions correspond with the profiles of the display item and support member, respectively, to be engaged therewith.

The preferred embodiment of the present invention uses the merchandise as the support member for the display device, and also provides for the display of other merchandise or advertising materials adjacent the merchandise. Additionally, the present invention enables advertising materials, for example, to be supported in the display portion positioned between paint cans arranged in a close-pack relationship in a box, on the floor, or in a pyramid display. The present invention also enables the display device to suspend display items from a can positioned on a shelf, so that the display items are readily visible and attractively displayed extending from the merchandise shelf.

In the preferred embodiment of the invention, the body member is manufactured by vacuum forming the one-piece body member of a deformable plastic. In an open position in which the body member is formed, the first and second profile portions, one on each half of the body, have predetermined first and second configurations extending from the same side of the body member. The predetermined configurations of the profile portions are positioned such that upon deforming the body member by folding or bending it in half so that the free ends contact one another, the mirror image first and second profile portions are aligned opposite one another to form the display and support portions, in surrounding engagement with a display item and support member.

The body member is maintained in display position in clamping engagement with the display item and support member using the fastener clips. The clips are extruded from resilient plastic material, and have a U-shaped cross-sectional configuration. The clips are resiliently engaged with flanges at the free ends of the body member to secure and maintain the body member in the display position. Additionally, the clips are of sufficient strength to maintain clamping engagement of the body member surrounding the display item and support member to resist movement therebetween.

In an alternate embodiment of the invention, the predetermined configurations of the profile portions forming the display portion, each include a bottom wall extending outwardly from the profile portions. In the display position, the bottom walls of the display portion cooperate to form a cup-shaped container for supporting other merchandise, for example, paint brushes or other accessories.

In a further embodiment of the invention, the predetermined configurations of the first and/or second profile portions are selectively formed in the shape of one half of a rectangle to engage a support member and/or display item having a rectangular profile. The profile portions of the body member may be extruded to engage support members or display items having any number of different profiles.

A merchandise display device constructed in accordance with the present invention provides a more efficient merchandise display device which uses the merchandise itself to support other merchandise, advertising materials or the like. By using a one-piece deformable plastic body member and extruded fastener clips, the display device is inexpensive to manufacture, and may be conveniently used and reused in a variety of different display situations.

Other features and advantages of the present invention will be better understood from the following detailed description and attached drawings setting forth in detail the embodiments of the invention which are only a few of the various embodiments of the principles of the invention.

DETAILED DESCRIPTION OF THE PRESENT INVENTION

Figure 1:
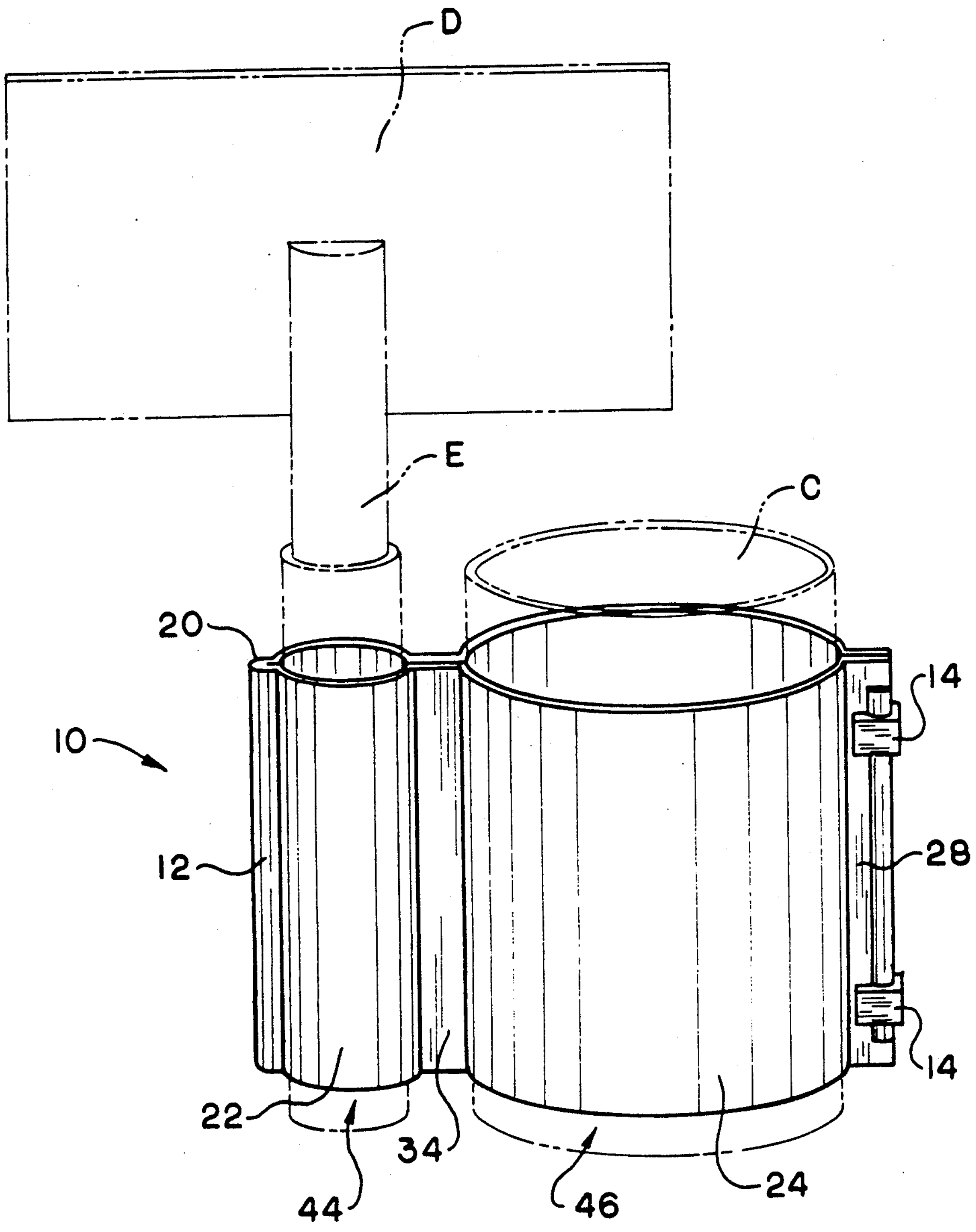
FIG. 1 is a perspective view of the merchandise display device constructed in accordance with the present invention in display position engaging a support member, with the display item and advertising materials being shown in phantom.

A display device, indicated generally at 10, constructed in accordance with the present invention is illustrated in FIGS. 1-6 of the drawings. The display device 10 comprises a body member 12 and a fastener clip 14.

Where the structural elements are the same in the various embodiments set forth herein, the same reference numerals will be used, but with additional prime designations being used with respect to the additional embodiments.

Figure 2:
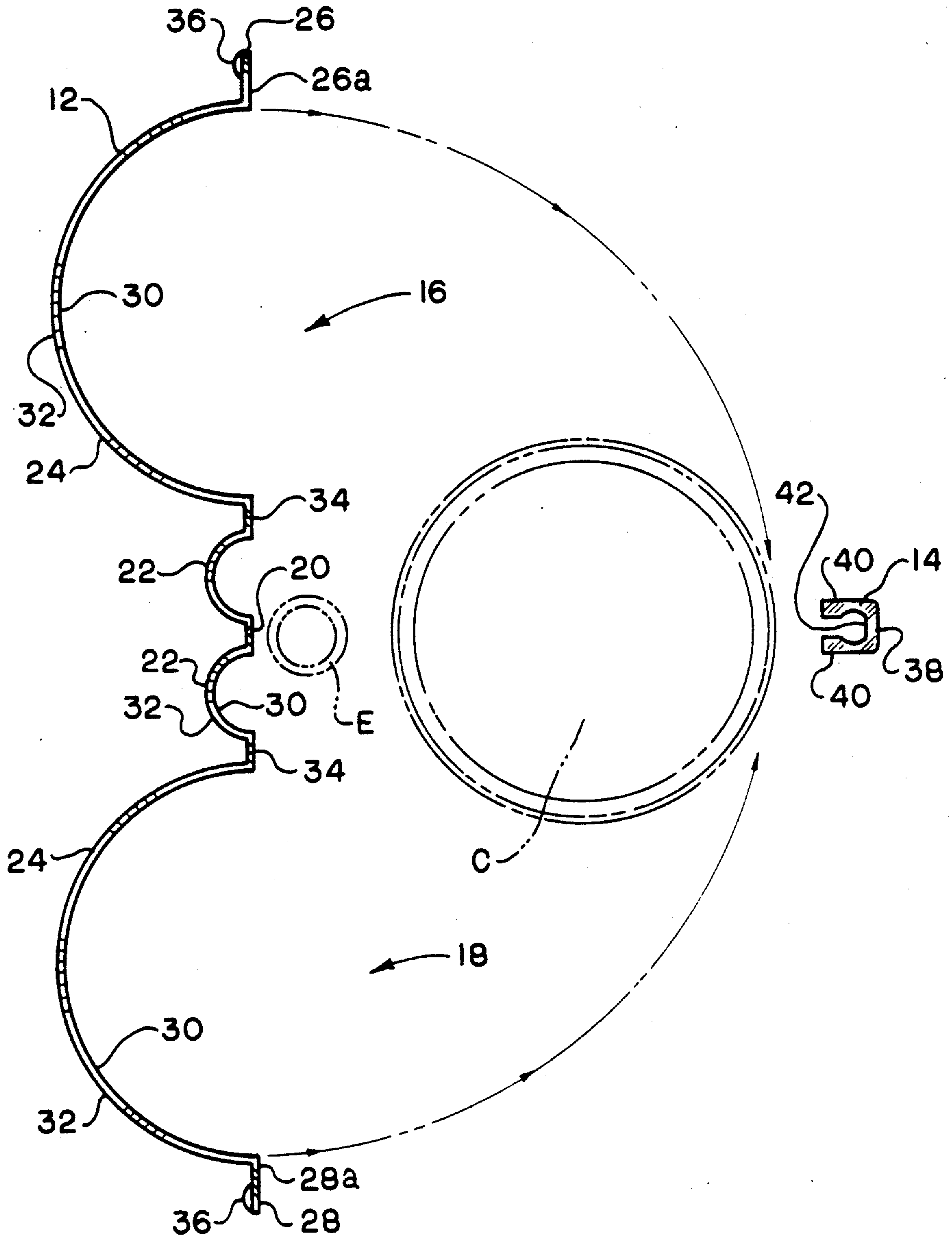
FIG. 2 is an exploded top view showing the body member in open position and the fastener clip, with the support member and display item to be engaged by the body member being shown in phantom.

The body member 12 is of a one-piece design, and is manufactured by vacuum forming the body member of a deformable plastic material. As illustrated in FIG. 2, the body member is normally in an open position, and includes first and second halves 16, 18, with a mid-point 20 intermediate the two halves. Each of the halves 16, 18 includes first and second profile portions 22, 24 having predetermined configurations.

In the merchandise display device illustrated in FIGS. 1-5, the profile portions have semi-circular predetermined configurations. The first profile portions 22 are located on either side, and equally spaced from, the mid-point 20. The second profile portions 24 are spaced from the first profile portions 22, and have outwardly turned flanges 26, 28 at their free ends. Each of the first and second profile portions 22, 24 has a semi-circular configuration in cross-section, an inner engagement surface 30 on the concave side of the profile portions, and an outer surface 32 on the convex side of the profile portions.

A spacer section 34 is positioned intermediate each of the first and second profile portions 22, 24 on opposite sides of the midpoint 20. Additionally, flanges 26, 28 at the free ends of the body member include abutment faces **26*a*, 26*b* extending from the second profile portions 24. The flanges 26, 28, each include a boss 36 for engagement with the fastener clip 14**.

The fastener clip 14 has a U-shaped cross-sectional configuration. The clip is manufactured by extruding the clip from a resilient plastic material. The clip includes a base 38 interconnected with leg portions 40 to form the U-shaped configuration. The inner surface 42 of the clip is configured for resilient engagement of the legs 40 over and around the bosses 36 on the first and second flanges 26, 28 at the free ends of the body member. As illustrated in FIG. 1, two vertically spaced clips 14 can be used to secure the flanges together. Alternatively, the clip 14 could be extruded in a longer form to allow only one clip to be used.

As illustrated in FIG. 2, movement of the first and second halves of the body member along the paths illustrated by the arrows about the midpoint 20, positions the display device 10 in the display position. In the display position illustrated in FIGS. 1 and 3, the first and second halves 16, 18 of the body member 12 are bent at the mid-point 20, and positioned side-by-side. In this position, the spacer sections 34 and the abutment faces **26*a*, 28*a* of the flanges 26, 28 are engaged. Additionally, a central dividing axis B, positioned intermediate the first and second halves 16, 18 of the body member, intersects the mid-point 20**. The halves of the body member are in mirror image relationship with respect to the dividing axis B.

In the display position, the first profile portions 22, cooperatively define a display portion 44, and the second profile portions 24 cooperatively define a support portion 46. The display and support portions each cooperatively form a cylindrical member having an open top and open bottom, with spacers 34 allowing the display item cylindrical member to project from the support member cylindrical member.

Figure 3:
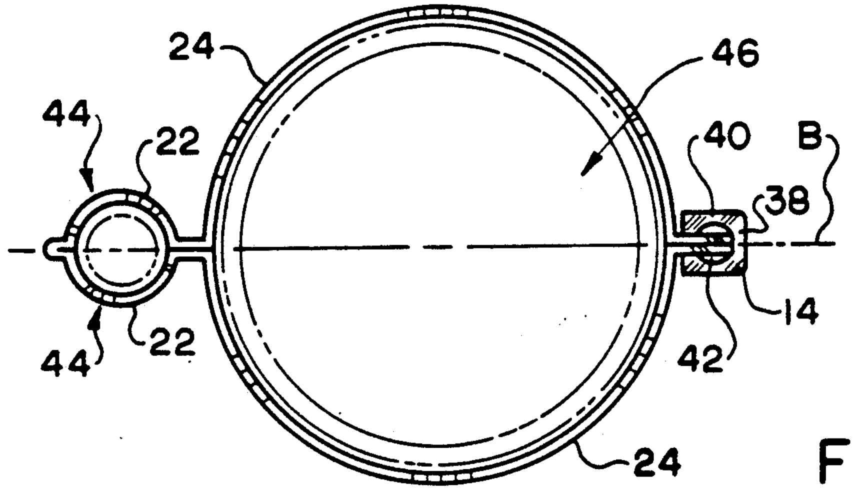
FIG. 3 is a top view of the merchandise display device constructed in accordance with the present invention in display position engaging a support member.

As shown in FIGS. 1 and 3, the support portion 46 surrounds and engages a support member C, or paint can. The engagement surfaces 30 of the second profile portions 24 are in clamping engagement with the support member C. The display portion 44, projecting therefrom; supports a display item D, or advertising sign. The engagement surfaces 30 of the display portion 44 formed by first profile portions 22 are in clamping engagement with a telescoping rod E which forms a part of the advertising sign D. Using the telescoping rod E, the advertising sign may be positioned at the height and location desired. Additionally, the location of the display portion 44, spaced from the support portion 46, enables the support portion of the display device to be mounted and clamped on a paint can located in the center of an arrangement of cans in close-pack relationship. In this support situation, the support portion is located in the interstices between the close packed cans.

The clamping engagement of the first and second halves of the body member with the support member C and display item D, is provided by the U-shaped fastener clip 14. The fastener clip must be of sufficient strength and resiliency to be engaged over the bosses 36 on the free end flanges 26, 28 of the body member. Once engaged over and around the flanges, the fastener clip exerts a clamping force which resists movement of the body member with respect to the support member, and the display items with respect to the display device 10.

Figure 4:
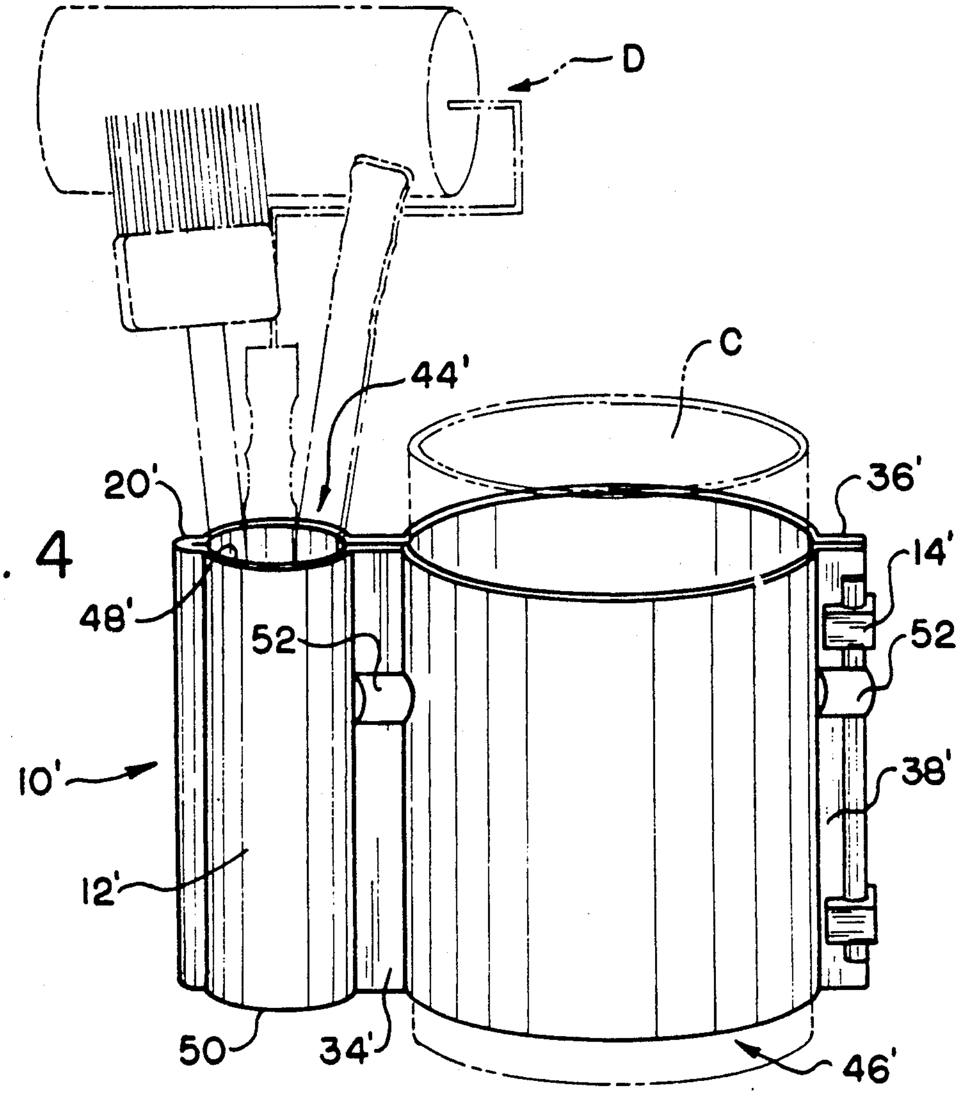
FIG. 4 is a perspective view of an alternate embodiment of the merchandise display device constructed in accordance with the present invention in display position engaging a support member, with additional merchandise being shown in phantom.
Figure 5:
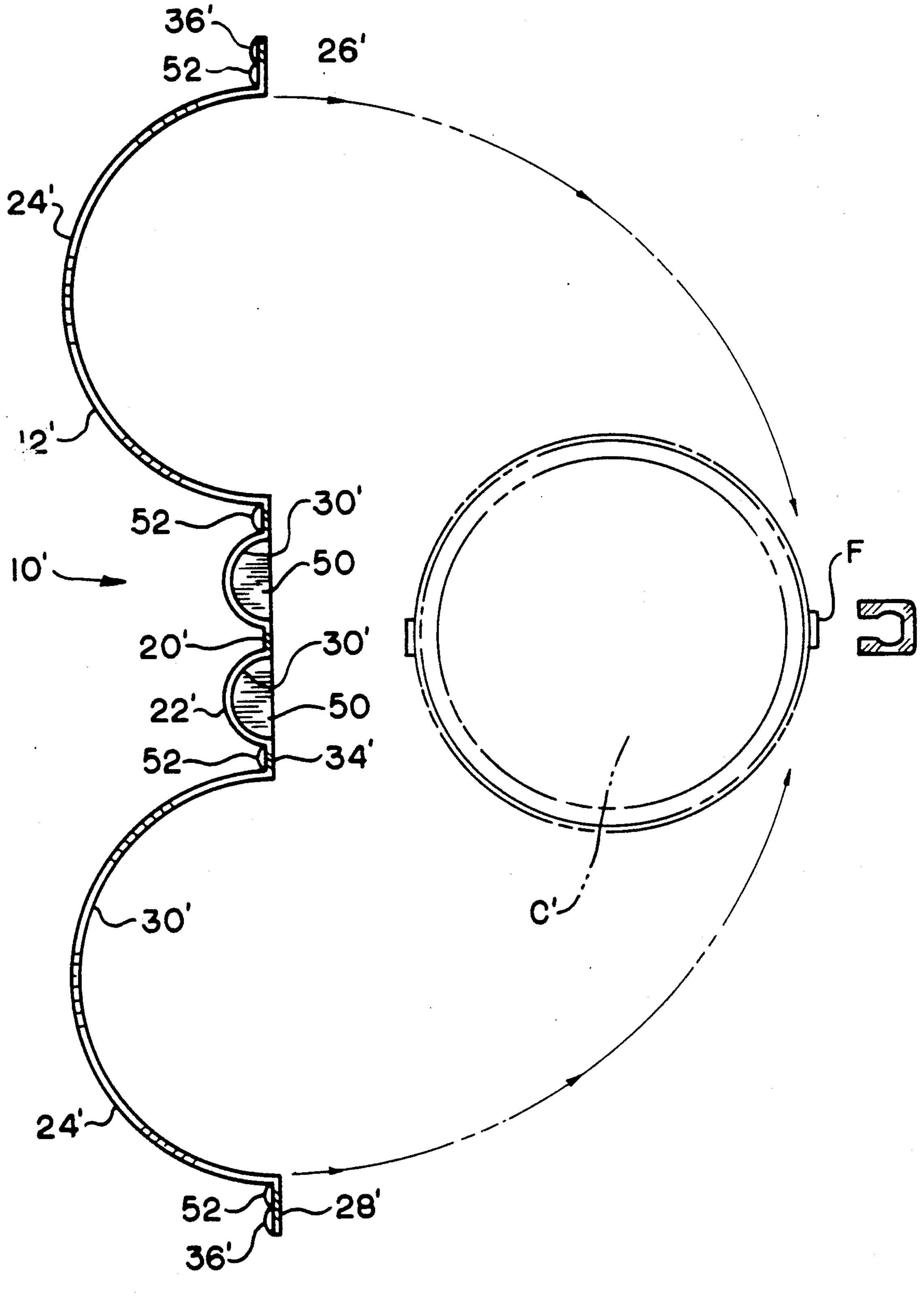
FIG. 5 is an exploded top view of the alternate embodiment of the body member in open position and the fastener clip, with the support member and display item to be engaged by the body member being shown in phantom.

In an alternate embodiment of the merchandise display device 10', illustrated in FIGS. 4 and 5, the display portion 44' functions as a cup-like container 48 for supporting other merchandise. The container 48 is formed in the display position by bottom walls 50 which extend from the engagement surfaces 30' in a semi-circle configuration. As shown in FIG. 4, the bottom walls 50 enable the merchandise to be supported within the display portion 44'.

The embodiment of FIGS. 4 and 5 additionally provides enlarged portions 52 located on the spacer sections 34' and adjacent the bosses 36' on the flanges at the free ends of the body member 10'. As further illustrated in FIG. 5, the enlargements 52 on the spacer sections and flanges 26', 28', are for accommodating the ears F located on opposite sides of the paint can C'. Alternatively, apertures, not illustrated, could be substituted for the enlargements 52 to avoid interference of the ears F when the body member 12' surrounds the support member C' in display position.

Like the embodiment illustrated in FIGS. 1-3, the alternate embodiment of FIGS. 4 and 5, is folded about the midpoint 20' into the display position along the path of arrows shown in FIG. 5. Once the body member 12' is folded at the mid-point 20', the fastener clips 14' are engaged over the bosses 36' on the free ends 26', 28' of the body member 12' to maintain the engagement surfaces 30' of the second profile portions 24' in engagement with the support member C'. With the support portion clamped in place, the display portion forms a projecting display cup which can receive and support items for display, such as the brush and roller illustrated in phantom in FIG. 4.

Figure 6:
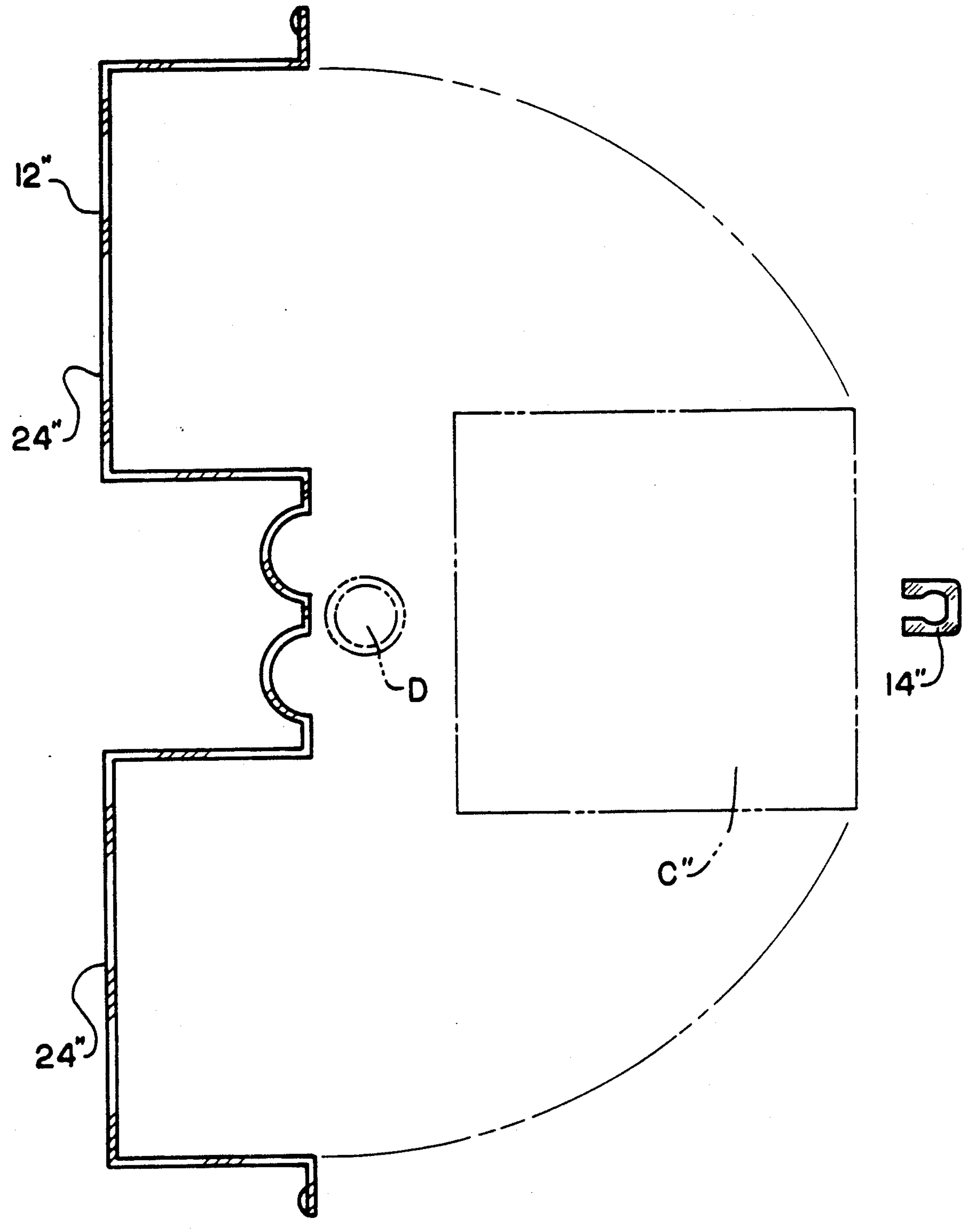
FIG. 6 is an explodeu :op view of another alternate embodiment of the body member in open position and the fastener clip, with the rectangular profile support member and display item to be engaged by the body member being shown in phantom.

A further alternate embodiment is illustrated in FIG. 6. This embodiment of the body member 12'' includes second profile portions 24'' having channel-like cross-sectional predetermined configurations. The configurations of the second profile portions are designed to engage a support member C'' having the rectangular cross-section configuration illustrated in phantom in FIG. 6. It is understood that the display items or support members engaged by the merchandise display device of the present invention may be of any desired cross-sectional configuration. Depending on the configuration, the first and second profile portions are shaped to accommodate the desired configurations. Additionally, the height of the body member from the open top to the open bottom may be of any size, in order to accommodate display items or support members of different sizes.

The present invention thus provides a low cost display device which may be easily manufactured in a variety of sizes and configurations which are readily adapted to a variety of merchandise display situations in retail stores. The invention is easy to assemble, attractive, and may be used in either the indoor or outdoor environments. Additionally, the use of the merchandise itself to support the display items eliminates the need for other display devices mounted on shelves or adjacent merchandise being displayed.

While a preferred embodiment of the invention has been disclosed in detail, along with certain alternative constructions and arrangements, the present invention is not to be considered limited to the precise constructions disclosed herein. Various adaptations, modifications and uses of the invention may occur to those skilled in the art to which the invention relates, and the intention is to cover all such adaptations, modifications and uses falling within the spirit and scope of the appended claims.

I claim:

1. A merchandise display device for merchandise, advertising materials, or the like, said device comprising,
   - a body member having a support portion for engagement with a support member, and a display portion for supporting display items, and
   - a fastener clip for securing and maintaining said body member in a display position,
   - said support and display portions being formed when said body member and fastener clip are in display position, by first and second halves of the body member in substantially mirror image relationship with respect to a central axis, said central axis dividing said first and second halves and intersecting a mid-point along said body member, and free ends of said first and second ends of the body member secured together by said fastener clip, and
   - each of said first and second halves of the body member having mirror image profile portions of predetermined configurations extending outwardly from said central axis to enable said support portion to engage and surround a desired support member, and to enable said display portion to engage a desired display item,
   - each of said first and second halves of the body member having an inner profile section and an outer profile section;
   - wherein said inner profile sections are separated from each other and said outer profile sections by spacer segments; wherein flanges extend from the free ends of said body member; and
   - wherein said spacer segments and said flanges are substantially collinear when said body member is in an open position.

2. The display device of claim 1 further including a display item comprising a sign supported by said display portion, said sign comprising a placard displaying advertising materials and a telescoping support rod in clamped engagement with said display portion.

3. The display device of claim 1 wherein said support portion and said display portion are of substantially equal height.

4. The display device of claim 1 wherein each of said support portion and said display portion form a cylindrical member in a display position, having an open top and an open bottom.

5. The display device of claim 1 wherein said display portion is formed from first mirror image profile portions and said support portion is formed from second mirror image profile portions, said first profile portions being positioned closer to said mid-point along said body member than said second profile portions, and said first profile portions formed by uninterrupted surfaces.

6. The display device of claim 1 wherein each of said support portion and said display portion form a rectangular member in a display position, having an open top and an open bottom.

7. The display device of claim 1 wherein the predetermined configuration of said first profile portions on said first and second halves of the body member forming said support portion are semi-circular in cross-section, and in display position provide the support portion with a circular cross-section, said circular support portion having a diameter for surrounding a desired support member having profile corresponding to the support portion, and which is in clamping engagement in the display position to resist movement of said display device with respect to the support member in the display position.

8. The display device of claim 7 wherein said predetermined configuration of said second profile portions on said first and second halves of the body member forming said display portion are semi-circular in cross-section, and in display position provide the display portion with a circular cross-section said circular display portion having a diameter for surrounding a desired display item having a profile corresponding to the display portion, and which is in clamping engagement in the display position to resist movement of said display item with respect to the body member.

9. The display device of claim 1 wherein said fastener clip comprises a U-shaped member engaged with said free ends of said first and second halves of said body member with sufficient force to maintain said body member in clamped engagement with said support member in the display position.

10. A merchandise display device for merchandise, advertising materials, or the like, said device comprising:

a body member having a support portion for engagement with a support member and a display portion for supporting display items; and a fastener clip for securing and maintaining said body member in a display position;

wherein said support and display portions are formed when said body member and fastener clip are in display position, by first and second halves of the body member in substantially mirror image relationship with respect to a central axis, said central axis dividing said first and second halves and intersecting a mid-point along said body member, and free ends of said first and second ends of the body member secured together by said fastener clip;

wherein each of said first and second halves of the body member have mirror image profile portions of predetermined configurations extending outwardly from said central axis to enable said support portion to engage and surround a desired display item;

wherein the predetermined configuration of said first profile portions on said first and second halves of the body member forming said support portion are semi-circular in cross-section, and in display position provide the support portion with a circular cross-section, said circular support portion having a diameter for surrounding a desired support member having a profile corresponding to the support portion, and which is in clamping engagement in the display position to resist movement of said display device with respect to the support member in the display position; and wherein said predetermined configuration of said second profile portions on said first and second halves of the body member forming said display portion are semi-circular in cross-section, and further include a bottom wall, said bottom wall on each of said second profile portions has a semi-circular configuration, and extends in a direction toward said central axis for supporting merchandise within said display portion in the display position.

11. The display device of claims 8, 9 or 10 wherein said body member comprises a one-piece vacuum formed member of deformable plastic material.

12. The display device of claim 11, wherein the fastener clip is extruded of a resilient plastic material.

13. A merchandise display device for merchandise, advertising materials, or the like, said device comprising:

a body member having a support portion for engagement with a support member, a display portion for supporting display items, and a fastener clip for securing and maintaining said body member in a display position; and a support member and wherein said support member is a can;

said support and display portions being formed when said body member and fastener clip are in display position, by first and second halves of the body member in substantially mirror image relationship with respect to a central axis, said central axis dividing said first and second halves and intersecting a mid-point along said body member, and free ends of said first and second ends of the body member secured together by said fastener clip; and each of said first and second halves of the body member having mirror image profile portions of predetermined configurations extending outwardly from said central axis to enable said support portion to engage and surround a desired display item.

14. A merchandise display device for merchandise, advertising materials, or the like, said device comprising:

a body member having a support portion for engagement with a support member and a display portion for supporting display items; and p1 a fastener clip for securing and maintaining said body member in a display position;

wherein said support and display portions are formed when said body member and fastener clip are in display position, by first and second halves of the body member in substantially mirror image relationship with respect to a central axis, said central axis dividing said first and second halves and intersecting a mid-point along said body member, and free ends of said first and second ends of the body member secured together by said fastener clip;

wherein each of said first and second halves of the body member have mirror image profile portions of predetermined configuration extending outwardly from said central axis to enable said support portion to engage and surround a desired support member, and to enable said display portion to engage a desired display item;

wherein flanges extend from the free ends of said body member and said flanges include bosses for coacting with said fastener clip.

* * * * *

65